United States Patent
Kondo et al.

(10) Patent No.: US 8,990,630 B2
(45) Date of Patent: *Mar. 24, 2015

(54) SERVER HAVING MEMORY DUMP FUNCTION AND MEMORY DUMP ACQUISITION METHOD

(75) Inventors: Hiroshi Kondo, Kawasaki (JP); Ryo Tabei, Kawasaki (JP); Kenji Gotsubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 187 days.

This patent is subject to a terminal disclaimer.

(21) Appl. No.: 13/342,633

(22) Filed: Jan. 3, 2012

(65) Prior Publication Data

US 2012/0102358 A1 Apr. 26, 2012

Related U.S. Application Data

(63) Continuation of application No. PCT/JP2009/003257, filed on Jul. 10, 2009.

(51) Int. Cl.
*G06F 11/07* (2006.01)
*G06F 11/14* (2006.01)

(52) U.S. Cl.
CPC ........ *G06F 11/0778* (2013.01); *G06F 11/1417* (2013.01); *G06F 11/0793* (2013.01); *G06F 11/0724* (2013.01)
USPC ............................. 714/38.11; 714/23; 714/24

(58) Field of Classification Search
CPC ............ G06F 11/0724; G06F 11/0778; G06F 11/0793; G06F 11/1417
USPC .......................................... 714/23, 24, 38.11
See application file for complete search history.

(56) References Cited

U.S. PATENT DOCUMENTS

| | | | | |
|---|---|---|---|---|
| 6,189,111 | B1 * | 2/2001 | Alexander et al. | 714/6.13 |
| 6,718,383 | B1 * | 4/2004 | Hebert | 709/224 |
| 7,464,378 | B1 * | 12/2008 | Limaye et al. | 718/100 |
| 7,698,390 | B1 * | 4/2010 | Harkness et al. | 709/220 |
| 7,877,358 | B2 * | 1/2011 | Ritz et al. | 707/640 |
| 8,069,218 | B1 * | 11/2011 | Tormasov et al. | 709/216 |

(Continued)

FOREIGN PATENT DOCUMENTS

| | | |
|---|---|---|
| EP | 1 341 085 A2 | 9/2003 |
| EP | 1638000 A2 | 3/2006 |

(Continued)

OTHER PUBLICATIONS

International Search Report for PCT/JP2009/003257, mailed Sep. 15, 2009.

(Continued)

*Primary Examiner* — Chae Ko
(74) *Attorney, Agent, or Firm* — Staas & Halsey LLP

(57) ABSTRACT

A server having a plurality of system boards, comprising: a panic processing unit configured to stop (panic) the server; a system board information storage unit configured to store information to identify a system board having a memory used by a kernel; a system board detaching processing unit configured to detach the system board having the memory used by the kernel before server stoppage; and a reboot processing unit configured to reboot the server using system boards other than the separated system board among the plurality of system boards, after detaching the system board having the memory used by the kernel.

11 Claims, 6 Drawing Sheets

(56) References Cited

U.S. PATENT DOCUMENTS

| | | | |
|---|---|---|---|
| 8,086,906 B2 * | 12/2011 | Ritz et al. | 714/48 |
| 2003/0163744 A1 * | 8/2003 | Yamazaki | 713/300 |
| 2004/0221036 A1 * | 11/2004 | Smith | 709/225 |
| 2006/0069944 A1 | 3/2006 | Oguma | |
| 2006/0248384 A1 * | 11/2006 | Safford | 714/11 |
| 2007/0006226 A1 | 1/2007 | Hendel | |
| 2007/0094659 A1 * | 4/2007 | Singh et al. | 718/1 |
| 2007/0101191 A1 | 5/2007 | Iwama | |
| 2008/0120518 A1 * | 5/2008 | Ritz et al. | 714/3 |
| 2008/0133968 A1 | 6/2008 | Muppirala et al. | |
| 2008/0307425 A1 * | 12/2008 | Tripathi | 718/104 |
| 2009/0113034 A1 * | 4/2009 | Krishnappa et al. | 709/223 |
| 2009/0217087 A1 * | 8/2009 | Nakajima | 714/13 |
| 2010/0162052 A1 | 6/2010 | Shimogawa | |
| 2010/0306573 A1 * | 12/2010 | Gupta | 714/44 |
| 2011/0225458 A1 | 9/2011 | Zuo et al. | |
| 2011/0289343 A1 * | 11/2011 | Schaefer et al. | 714/4.1 |
| 2012/0023209 A1 * | 1/2012 | Fletcher et al. | 709/223 |

FOREIGN PATENT DOCUMENTS

| | | |
|---|---|---|
| GB | 1638000 A2 | 3/2006 |
| JP | 7-234808 | 9/1995 |
| JP | 10-133918 | 5/1998 |
| JP | 11-212836 | 8/1999 |
| JP | 2001-229053 | 8/2001 |
| JP | 2001-290678 | 10/2001 |
| JP | 2003-256396 | 9/2003 |
| JP | 2005-122334 | 5/2005 |
| JP | 2006-072931 | 3/2006 |
| JP | 2006-172100 | 6/2006 |
| JP | 2007-133544 | 5/2007 |

OTHER PUBLICATIONS

European Search Report mailed Jun. 13, 2014 in corresponding European Application No. 10861466.8-1951.
U.S. Appl. No. 13/926,423, filed Jun. 25, 2013, Hiroshi Kindou, et al, Fujitsu Limited.
U.S. Appl. No. 13/902,849, filed May 26, 2013, Hiroshi Kindou, et al, Fujitsu Limited.
Extended European Search Report issued Jul. 1, 2013 in corresponding European Application No. 09847046.1.
Taiwan Office Action mailed Dec. 1, 2014 in the corresponding Taiwan Application No. 102118623.
Japanese Office Action mailed Mar. 25, 2014 in corresponding Japanese Application No. 2012-550617.
European Search Report mailed Jun. 6, 2014 in corresponding European Application No. 13169691.6-1951.
European Search Report mailed Jun. 13, 2014 in corresponding European Application No. 10861466.0-1951.
PCT/IB/331 mailed Jul. 11, 2013 in corresponding International Application PCT/JP2010/073637.
PCT/IB/210 mailed Mar. 29, 2011 in corresponding International Application PCT/JP2010/073637.
U.S. Office Action mailed Mar. 14, 2014 in corresponding U.S. Appl. No. 13/926,423.
Taku Yasui, "Kernel Memory Management", Nikkei Linux, Nikkei Business Publications, Inc., Jan. 8, 2004, vol. 6, No. 1, pp. 123-130.
"Improving Operating System Crash Dump Performance on a Virtual Machine", Research Disclosure, Mason Publications, Hampshire, GB., vol. 519, No. 77, Jul. 1, 2007, p. 756.
Japanese Office Action mailed Sep. 2, 2014 in corresponding Japanese Application No. 2012-550617.
U.S. Office Action mailed Jan. 2, 2015 in corresponding U.S. Appl. No. 13/902,849.
U.S. Notice of Allowance mailed Nov. 26, 2014 in corresponding U.S. Appl. No. 13/926,423.
Japanese Office Action mailed Jan. 20, 2015 in corresponding Japanese Application No. 2012-550617.
Korean Office Action mailed Jan. 6, 2015 in corresponding Korean Application No. 10-2013-0069068.

* cited by examiner

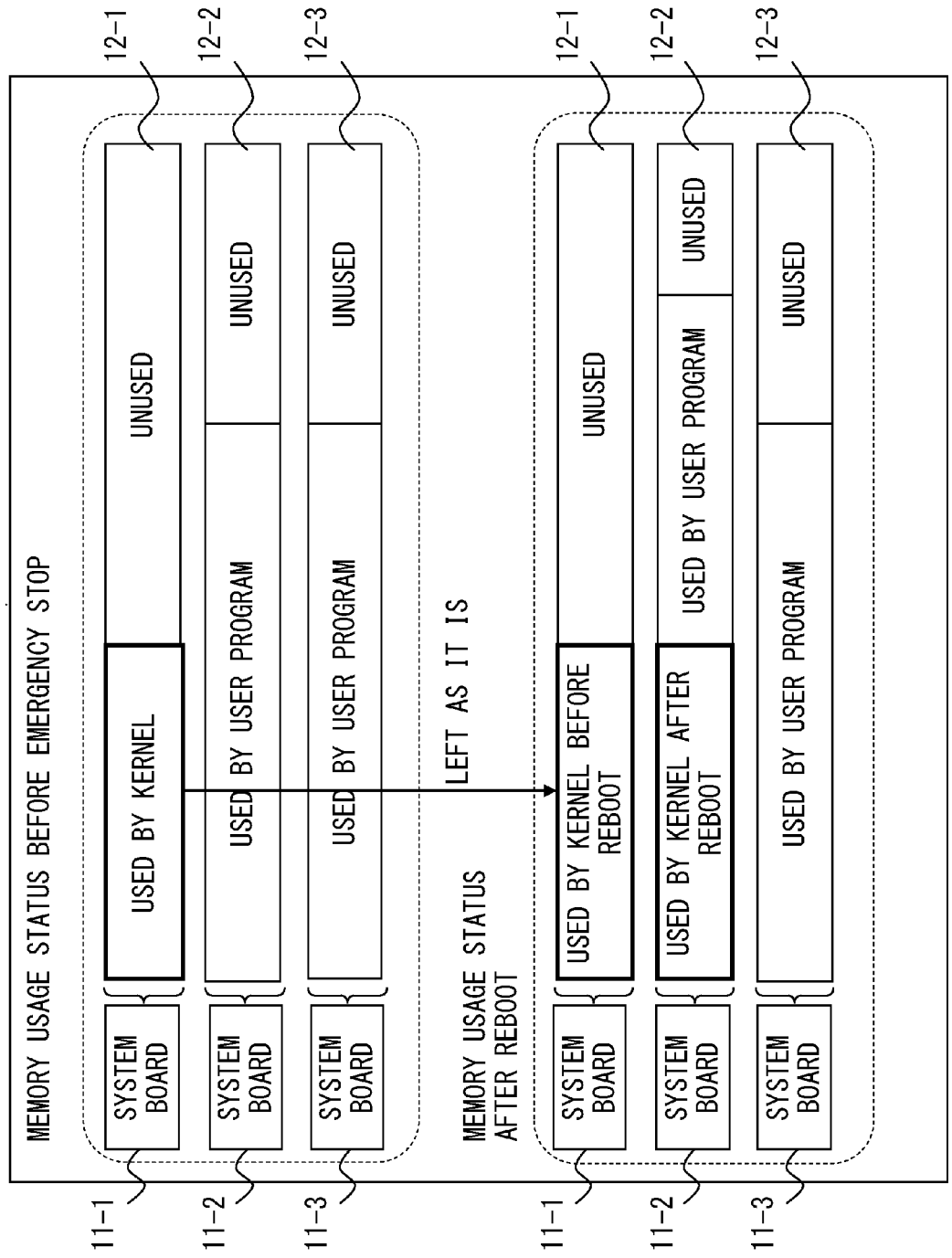
F I G. 1

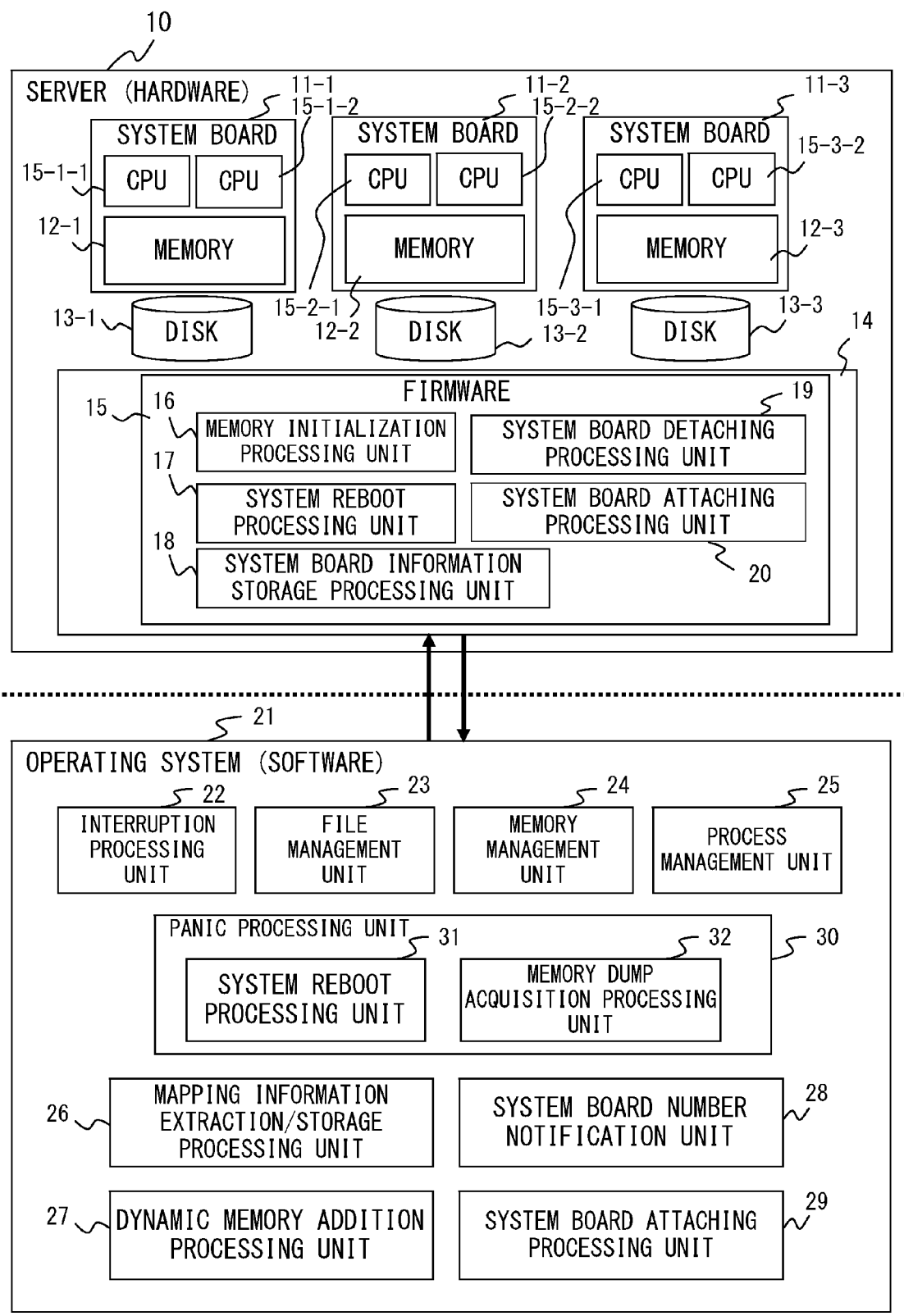
F I G. 3

SERVER HAVING MEMORY DUMP FUNCTION AND MEMORY DUMP ACQUISITION METHOD

CROSS-REFERENCE TO RELATED APPLICATIONS

This application is a continuation of PCT application of PCT/JP2009/003257, which was filed on Jul. 10, 2009.

FIELD

The present invention relates to a server having memory dump function and a memory dump acquisition method.

BACKGROUND

In recent years, as adoption of the UNIX (registered trademark) server and the IA server in the main system has started, an emphasis has been put on high availability of the UNIX (registered trademark) server and the IA server. Generally, when a critical error occurs in a system, the system is brought to an emergency stop (panic), and a memory dump is saved in the disk to investigate its cause.

While the system is stopped, the system cannot be used, so prompt reboot of the system is an important requirement.

However, in recent years, servers with a mounted memory capacity of a TB (terabyte) order have been around, and in these systems, it takes a significant amount of time to obtain a memory dump, making it impossible to reboot the system promptly.

In addition, a method in which the memory dump is not saved on the disk but memory contents at the time of panic is saved on another memory and a method in which when memory contents at the time of occurrence of a failure is saved in a dump storage area, a part of the memory is saved, and unsaved memory contents are converted into a dump file after reboot have been known.

However, there has been a problem with conventional methods that, since the memory dump at the time of occurrence of a fatal error is saved in another memory or a disk, if the size of the memory dump to be saved is large, copy of the memory takes time, making it impossible to reboot the system promptly.

Patent document 1: Japanese Laid-open Patent Publication No. H11-212836
Patent document 2: Japanese Laid-open Patent Publication No. 2001-229053

SUMMARY

In a server of an embodiment, a server having a plurality of system boards, including a panic processing unit configured to stop (panic) the server; a system board information storage unit configured to store information to identify a system board having a memory used by a kernel; a system board detaching processing unit configured to detach the system board having the memory used by the kernel before server stoppage; and a reboot processing unit configured to reboot the server using system boards other than the detached system board among the plurality of system boards, after detaching the system board which has the memory used by the kernel is provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram according to an embodiment presenting a status of a memory of each system board.
FIG. 3 is a configuration diagram of a server according to an embodiment.

DESCRIPTION OF EMBODIMENT(S)

Hereinafter, an embodiment of the present invention is described with reference to the drawings.

First, the status of the memory of each system board at the time when the memory dump acquisition method of the present embodiment is executed is described.

FIG. 1 is a diagram according to the embodiment presenting the status of the memory of each system board.

The upper part of FIG. 1 presents the usage status of the memory of each system board before rebooting the server, and the lower part of FIG. 1 presents the usage status of the memory of each system board after reboot.

In the present embodiment, it is assumed that the server (system) has three system boards 11-i (i=1-3).

Before reboot, the kernel is using a memory 12-1 of the system board 11-1, and a user program is using a memory 12-2 of the system board 11-2 and a memory 12-3 of the system board 11-3.

After reboot, in the area in the memory 12-1 of the system board 11-1 used by the kernel, the state immediately before reboot is maintained. Meanwhile, the memory 12-2 of the system board 11-2 is used by the kernel after reboot and the user program. The state of the memory 12-1 that was used by the kernel before reboot is maintained after reboot. This is in order to generate a dump file after reboot based on the contents of the memory 12-1.

Figure 2A:
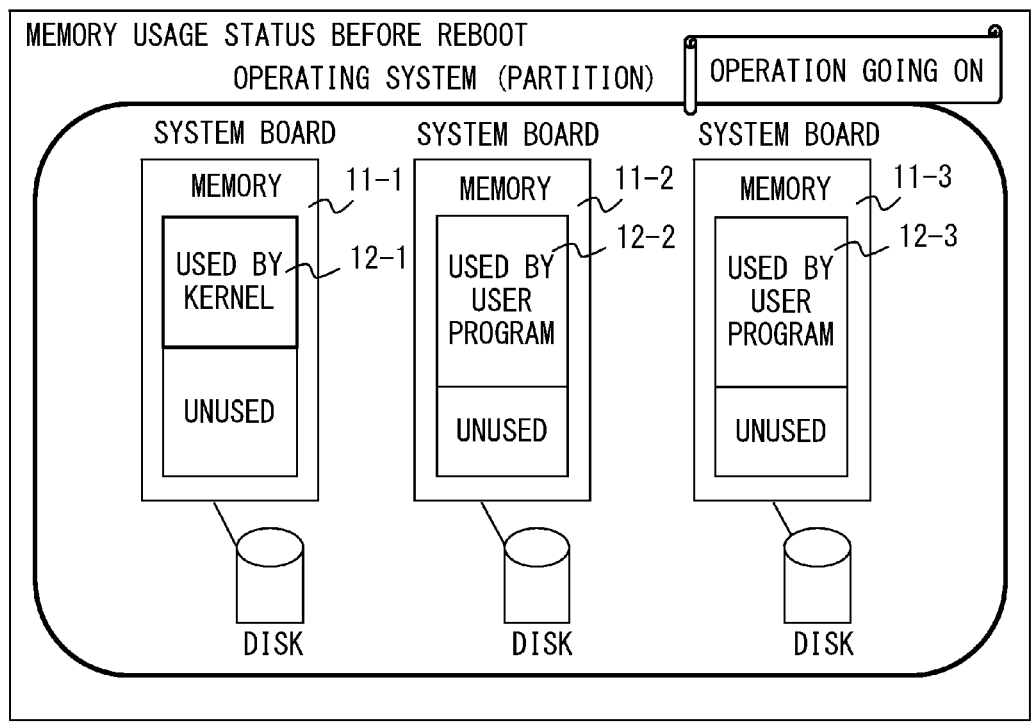
FIG. 2A is a diagram according to an embodiment presenting a usage status of a memory of each system board during normal operation before stop (panic).

FIG. 2A is a diagram according to the embodiment presenting the usage status of the memory of each system board during normal operation before stop(panic).

Before stop(panic) (before reboot) of the system, the kernel is using the memory 12-1 of the system board 11-1, and the user program is using the memories 12-2, 12-3 of the system board 11-1 and the system board 11-3.

Figure 2B:
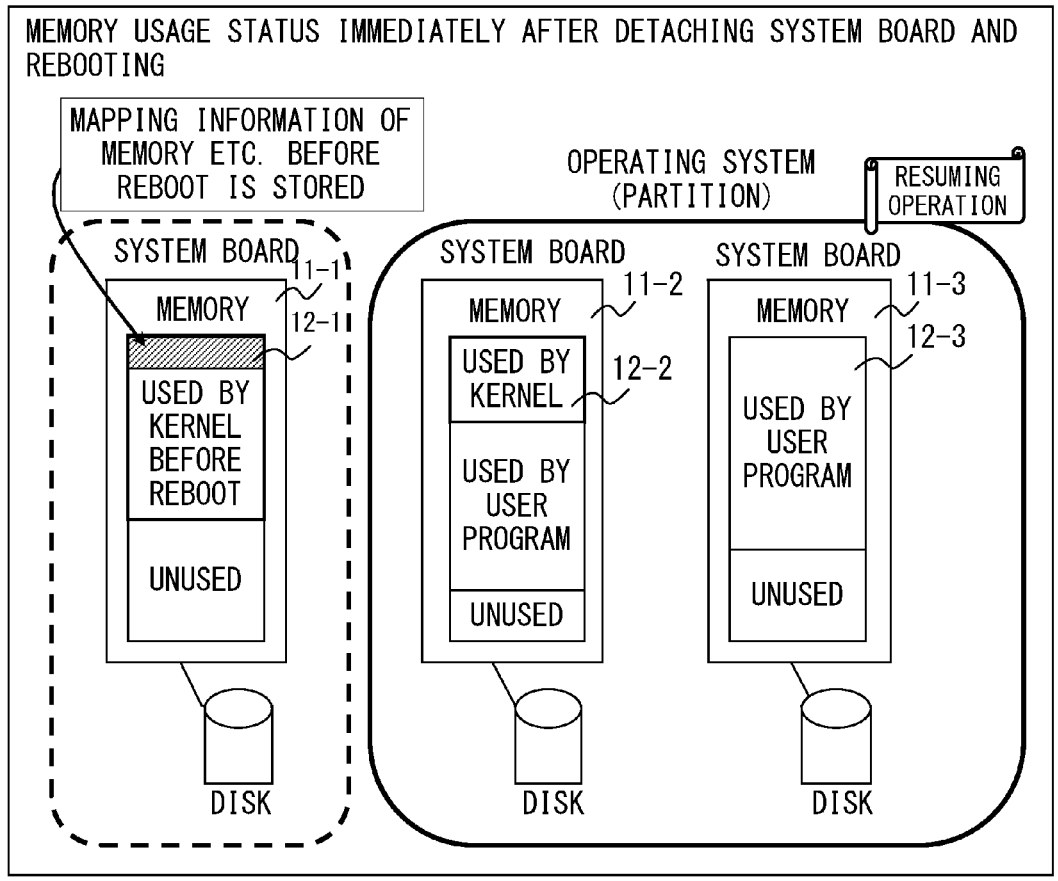
FIG. 2B is a diagram according to an embodiment presenting a usage status of a memory of each system board immediately after reboot.

FIG. 2B is a diagram according to an embodiment presenting the usage status of the memory of each system board immediately after reboot.

After rebooting the system, in the area in the memory 12-1 of the system board 11-1 used by the kernel, the state used by the kernel before reboot is maintained. Meanwhile, mapping information of the memory before reboot is written into the memory 12-1 before stop(panic).

The system detaches the system board 11-1 from the partition in advance using a Dynamic Reconfiguration function when rebooting, so as not to use the system board 11-1 at the time of rebooting. Accordingly, as illustrated in FIG. 2B, the system board 11-1 is detached from the partition.

The partition is a set of system boards assigned to the operating system. The operating system operates using the system boards attached (assigned) into the partition.

Meanwhile, the memory 12-2 of the system board 11-2 is used by the kernel after reboot. The memory 12-3 of the system board 11-3 is used by the user program.

Figure 2C:
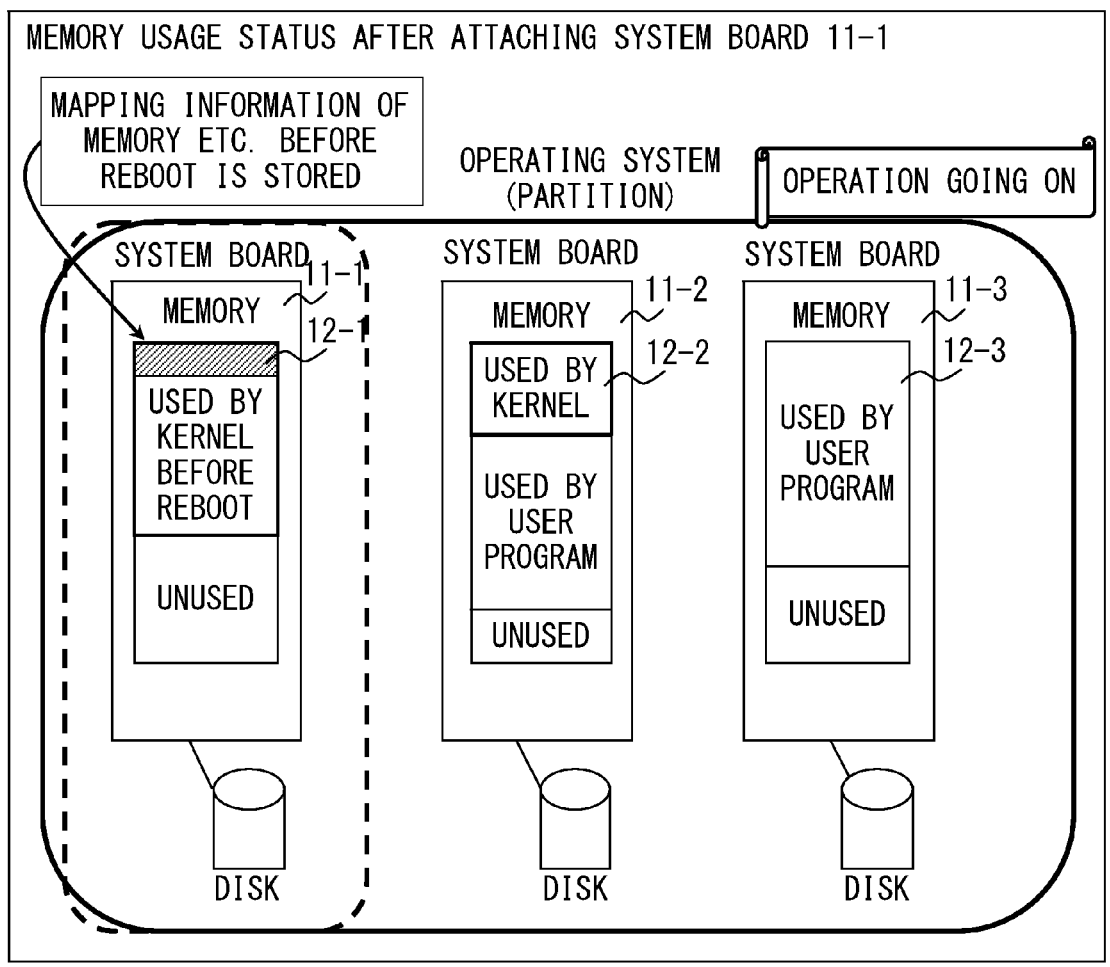
FIG. 2C is a diagram according to an embodiment illustrating a usage status of a memory of each system board after a detached system board is attached again.

FIG. 2C is a diagram according to the embodiment illustrating the usage status of the memory of each system board after the detached system board is attached into the partition again.

The server attaches the system board 11-1 that was detached after rebooting the system into the partition autonomously. Accordingly, the server recognizes the memory 12-1 of the system board 11-1, making it possible to generate a dump file. Meanwhile, the dump file is generated in a disk that the server has, for example.

When the operating system detects a certain error and brings the system to stop(panic), the system of the embodiment detaches the system board which has the memory area used by the kernel, and reboots the operating system with the remaining system boards only. The memory area used by the kernel before stop(panic) is left as it is on the detached system board. Accordingly, the system may be rebooted promptly to resume operation, without writing the dump of the memory used by the kernel onto a disk and the like.

FIG. 3 is a block diagram of the OS and the server according to the embodiment.

The server 10 has system board 11-i (i=1-3), disks 13-i, a ROM (Read Only Memory) 14.

The system board 11-i has a Central Processing Unit (CPU) 15-i-k (k=1,2) and a memory 12-i.

The CPU 15-i-k executes various processes.

The memory 12-i reads out and stores various programs from the disk 13-i.

The ROM 14 stores firmware 15.

The firmware 15 has a memory initialization processing unit 16, a system reboot processing unit 17, a system board information storage processing unit 18, a system board detaching processing unit 19, a system board attaching processing unit 20.

The memory initialization processing unit 16 initializes the memory 12-i.

The system initialization processing unit 17 reboots the server 10.

The system board information storage processing unit 18 stores information of the system board 11-i used in the server 10 and information of the number and the like of the system board 11-i that has the memory 12-i used by the kernel.

The system board detaching processing unit 19 detaches the system board 11-i from the partition.

The system board attaching processing unit 20 attaches the system board 11-i into the partition.

An OS (Operating System) 21 is installed in the server 10.

The lower part of FIG. 3 is a functional block of the OS 21.

The operating system 2*l* has an interruption processing unit 22, a file management unit 23, a memory management unit 24, a process management unit 25, a mapping information extraction/storage processing unit 26, a dynamic memory addition processing unit 27, a system board number notification unit 28, a system board attaching processing unit 29, and a panic processing unit 30.

The interruption processing unit 22 executes an interruption process.

The file management unit 23 manages a file being data stored on the disk.

The memory management unit 24 assigns the memory 12-i that the OS uses.

The process management unit 25 manages the process of the program that the OS 21 executes.

The mapping information extraction/storage processing unit 26 writes information required for obtaining and analyzing the dump of each memory 12-i into the fixed address of the memory 12-i used by the kernel.

Information that the mapping information extraction/storage processing unit 26 writes into the memory includes the text area, the data area, the heap area, the stack area of the kernel, mapping information (the logical address, the physical address, the size, etc.) of each segment, an address conversion table, a page table and the like, and mapping information of various control tables.

The dynamic memory addition processing unit 27 sends notification of the empty area of the available memory to the memory management unit 24.

The system board number notification unit 28 sends notification of the number of the system board which has the memory used by the kernel, and an instruction for forbidding the overwriting of the memory on the system board to the firmware 15.

The system board attaching processing unit 29 obtains the number of the system board detached by the partition from the system board information storage processing unit 18, and instructs the system board attaching processing unit 20 of the firmware 15 to attach the detached system board into the partition.

The panic processing unit 30 has a system reboot processing unit 31 and a memory dump acquisition processing unit 32.

The system reboot processing unit 31 reboots the OS.

The memory dump acquisition processing unit 32 reads out data in the memory area used by the kernel and generates a dump file.

Figure 4:
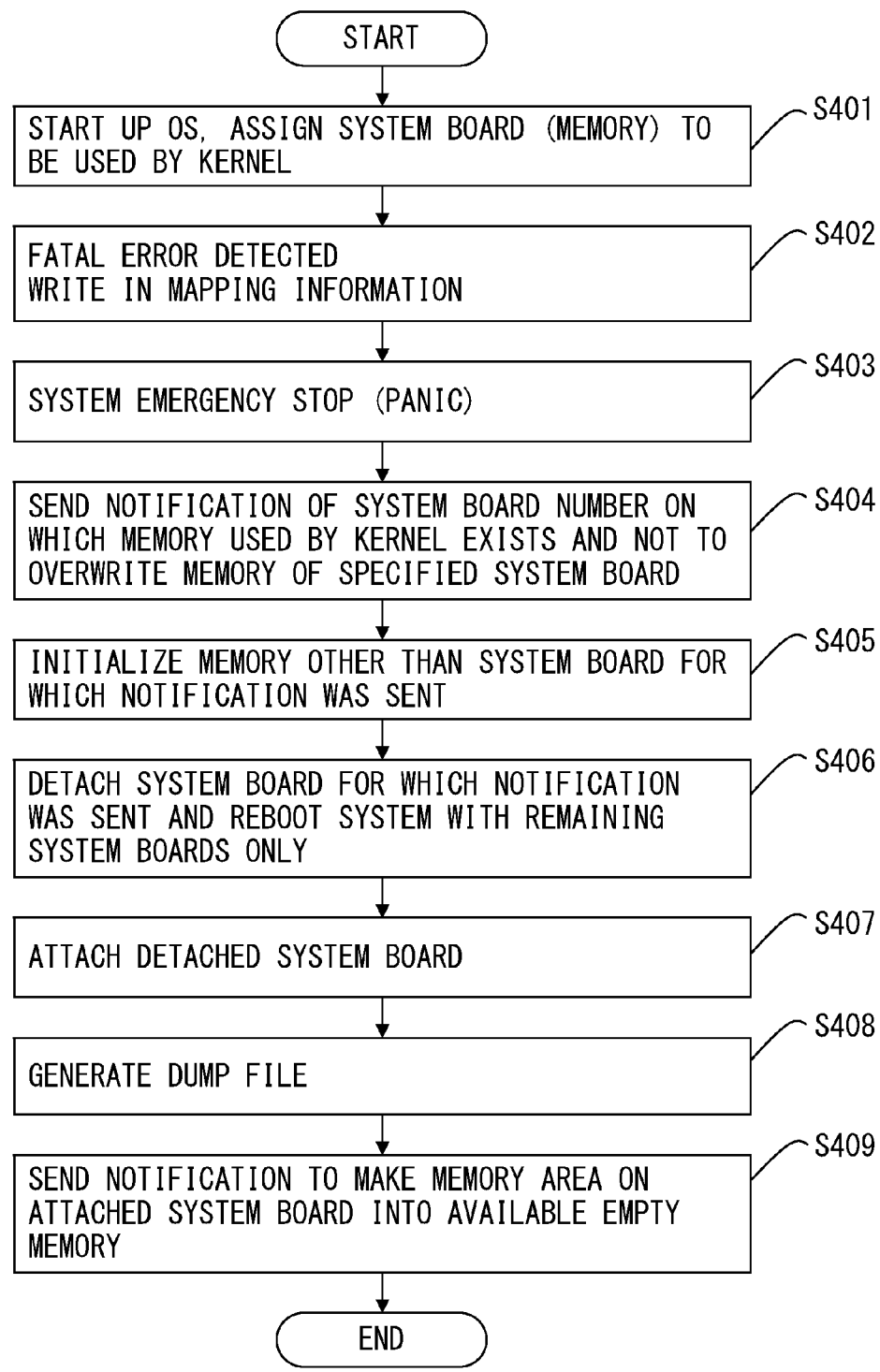
FIG. 4 is a flowchart of the operation of a memory dump acquisition apparatus according to an embodiment.

FIG. 4 is a flowchart of the operation of the server according to the embodiment.

In step S401, the memory management unit 24 of the OS 21 assigns the memory to be used by the kernel of the OS from the memory of the system board that has the smallest number for the system board number . By doing so, the number of system boards where the memory used by the kernel are reduced. This is to reduce the number of system boards to be detached, since the system boards on which the memory used by the kernel exists are detached at the time of reboot, as described later.

In the present embodiment, it is assumed that the system board numbers are assigned in order of the system board 11-1, 11-2, 11-3. Then, it is assumed that in step S401, the kernel is assigned to the memory 12-1 of the system board 11-1, that is, before the reboot described later, the OS 21 operates on the system board 11-1 (see FIG. 1, FIG. 2A).

In step S402, before the OS 21 detects a fatal error and brings the system to the emergency stop (panic), the mapping information extraction/storage processing unit 26 of the OS 21 writes mapping information required for obtaining/analyzing the dump of the memory used by the kernel into the fixed address of the memory of the system board that has the smallest system board number.

In step S403, the panic processing unit 30 of the OS 21 brings the system (server) to an emergency stop (panic).

In step S404, the system board number notification unit 28 of the OS 21 sends notification of the system board number of the system board on which the memory used by the kernel exists when the system is brought to the emergency stop (panic) and an instruction not to overwrite the memory of the system board to the firmware 15. Meanwhile, if there are a plurality of system boards which have the memory used by the kernel, a notification of all the system board numbers is sent to the firmware.

In step S405, the memory initialization processing unit 16 of the firmware 15 initializes the memory of system boards other than the system board for which the notification has been sent from the OS 21 that has the memory used by the kernel. Meanwhile, the contents of the memory of the system board that has the memory used by the kernel for which the notification has been sent is not initialized but is left as it is.

In step S406, the system board detaching processing unit 19 of the firmware 15 detaches the system board for which the notification has been sent from the OS 21, and sends a notification of the number of the detached system board to the system board information storage processing unit 18. The system board information storage processing unit 18 stores the number of the system board for which the notification has been sent from the system board detaching processing unit 19. The system reboot processing unit 17 of the firmware reboots the system with the remaining system boards only to resume operation.

In the present embodiment, the system board 11-1 to which the kernel is assigned is detached from the partition. Then, the system is rebooted using the remaining system board 11-2, 11-3. At this time, the kernel of the OS 21 after the reboot is assigned to the memory 12-2 of the system board 11.

That is, it is assumed that the OS 21 after the reboot operates on the system board 11-2 (see FIG. 1, FIG. 2B, FIG. 2C).

As described above, the system is rebooted promptly to resume operation, without writing the dump of the memory used by the kernel onto a disk and the like.

In step S407, after operation is resumed, the system board attaching processing unit 29 of the OS 21 obtains the system board number that was detached from the partition from the system board information storage processing unit 18 of the firmware 15, and instructs the system board attaching processing unit 20 of the firmware to attach the detached system board into the partition.

After rebooting the system and resuming the operation, the detached system board is attached using the Dynamic Reconfiguration function. Since the system board which has the memory used by the previous kernel was detached at the time of the reboot, the state of the memory used by the kernel before stop (panic) is maintained. Since the system board is attached into the partition while instructing the forbidding of the overwriting of the memory contents, it is possible to read out the memory to generate the dump file.

In step S408, the memory dump acquisition processing unit 32 of the OS 21 reads out information held in the memory area used by the kernel before rebooting the system from the memory on the attached system board, and generates as a dump file.

In step S409, after the dump file is generated, a dynamic memory addition processing unit 27 of the OS 21 sends a notification to make the memory area on the attached system board into an available empty memory, to the memory management unit 24 of the OS 21.

Meanwhile, while the kernel is assigned starting from the memory of the system board having the smallest system board in the present embodiment, the kernel may also be assigned starting from the memory of the system board having the largest system board number.

According to the server having the memory dump function of the embodiment, since copying to another memory and the like is not performed even when the size of the memory dump is large, the system may be rebooted promptly. Accordingly, the operation stop time may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A server having a plurality of system boards, comprising:
   a panic processing unit configured to stop(panic) the server;
   a mapping information processing unit configured to write mapping information required for obtaining and analyzing a dump of a memory used by a kernel into a fixed address of a memory in a system board that has the first order among the plurality of system boards that are ordered before the server is stopped;
   a system board information storage unit configured to store information to identify a system board having the memory used by the kernel;
   a system board detaching processing unit configured to detach the system board having the memory used by the kernel before server stoppage; and
   a reboot processing unit configured to reboot the server using system boards, which were used by a user program before the server stoppage, other than the detached system board among the plurality of system boards, after detaching the system board having the memory used by the kernel.

2. The server according to claim 1, further comprising a system board notification unit configured to send a notification of the system board having the memory used by the kernel to the system board information storage unit.

3. The server according to claim 1, further comprising a system board attaching processing unit configured to attach the detached system board after rebooting the server.

4. The server according to claim 3, further comprising a memory dump acquisition processing unit configured to read out data in an area used by the kernel before server stoppage in a memory of the system board attached by the system board attaching processing unit and to generate the data in the area as a dump file.

5. The server according to claim 4, further comprising a dynamic memory addition processing unit configured to send a notification that the area is an available empty area, after the dump file is generated.

6. The sever according to claim 1, further comprising a memory initialization processing unit configured to initialize a memory of system boards other than the system board used by the kernel among the plurality of the system board, when rebooting the server.

7. The server according to claim 1, further comprising a memory management unit configured to assign the memory used by the kernel from the memory of the system board that has the first order or the last order among the plurality of system boards that are ordered.

8. A memory dump acquisition method in a server having a plurality of system boards, the method comprising:

stopping(panicking) the server when a fatal error is detected;

writing, before stopping the server, mapping information required for obtaining and analyzing a dump of a memory used by a kernel into a fixed address of a memory in a system board that has the first order among the plurality of system boards that are ordered;

detaching a system board having the memory used by the kernel before sever stoppage;

rebooting the server using system boards, which were used by a user program before the server stoppage, other than the detached system board among the plurality of system boards, attaching the detached system board after rebooting the server; and reading out data in an area used by the kernel before server stoppage in a memory of the attached system board and to generate the data in the area as a dump file.

9. The method according to claim 8, further comprising assigning the memory used by the kernel from the memory of the system board that has the first order or the last order among the plurality of system boards that are ordered.

10. A server having a plurality of system boards each carrying a memory, comprising:

a stop(panic) processing unit configured to stop(panic) the server;

a mapping information processing unit configured to write mapping information required for obtaining and analyzing a dump of a memory used by a kernel into a fixed address of a memory in a system board that has the first order among the plurality of system boards that are ordered before the server is stopped;

a reboot processing unit configured to reboot the server using system boards, which were used by a user program before the server stoppage, other than a system board having the memory used by the kernel before the server is stopped;

a system board attaching processing unit configured to attach the system board including the memory used by the kernel before the server is stopped to the server, after the server is rebooted; and a memory dump acquisition processing unit to read out data in an area used by the kernel before server stoppage in an area of a memory carried on the system board attached by the system board attaching processing unit, to generate the data in the area as a dump file.

11. The server according to claim 10, further comprising a memory management unit configured to assign the memory used by the kernel from the memory of the system board that has the first order or the last order among the plurality of system boards that are ordered.

* * * * *

UNITED STATES PATENT AND TRADEMARK OFFICE
CERTIFICATE OF CORRECTION

PATENT NO. : 8,990,630 B2  
APPLICATION NO. : 13/342633  
DATED : March 24, 2015  
INVENTOR(S) : Hiroshi Kondo et al.

Page 1 of 1

It is certified that error appears in the above-identified patent and that said Letters Patent is hereby corrected as shown below:

In the Claims,

Column 6, Line 56, In Claim 6, delete "sever" and insert -- server --, therefor.

Signed and Sealed this
Twenty-first Day of July, 2015

Michelle K. Lee
*Director of the United States Patent and Trademark Office*